(12) United States Patent
McCambridge et al.

(10) Patent No.: US 11,560,219 B2
(45) Date of Patent: Jan. 24, 2023

(54) AIRCRAFT LANDING GEAR UPLOCK SYSTEM

(71) Applicant: AIRBUS OPERATIONS LIMITED, Bristol (GB)

(72) Inventors: Oliver McCambridge, Bristol (GB); Trevor Anthony Brighton, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 230 days.

(21) Appl. No.: 16/797,533

(22) Filed: Feb. 21, 2020

(65) Prior Publication Data
US 2020/0269973 A1 Aug. 27, 2020

(30) Foreign Application Priority Data
Feb. 25, 2019 (GB) .................................. 1902529

(51) Int. Cl.
| | |
|---|---|
| *B64C 25/28* | (2006.01) |
| *B64D 45/00* | (2006.01) |
| *H04L 67/12* | (2022.01) |
| *E05B 81/14* | (2014.01) |
| *E05B 47/00* | (2006.01) |

(52) U.S. Cl.
CPC .......... *B64C 25/28* (2013.01); *B64D 45/0005* (2013.01); *H04L 67/12* (2013.01); *E05B 81/14* (2013.01); *E05B 2047/0069* (2013.01)

(58) Field of Classification Search
CPC ..... B64C 25/28; B64D 45/0005; H04L 67/12; E05B 81/14; E05B 2407/0069

USPC ......................................................... 340/960
See application file for complete search history.

(56) References Cited

U.S. PATENT DOCUMENTS

| | | | |
|---|---|---|---|
| 5,257,840 A | 11/1993 | Rouzaud | |
| 2006/0163426 A1* | 7/2006 | Smith III | ................ B64C 25/26 244/102 R |
| 2014/0252210 A1 | 9/2014 | Schmidt | |

(Continued)

FOREIGN PATENT DOCUMENTS

| | | |
|---|---|---|
| EP | 2 730 500 | 5/2014 |
| EP | 3 000 723 | 3/2016 |

(Continued)

OTHER PUBLICATIONS

Extended European Search Report for European Application No. 20159125.2, 10 pages, dated Jul. 16, 2020.

(Continued)

*Primary Examiner* — Jack K Wang
(74) *Attorney, Agent, or Firm* — Nixon & Vanderhye P.C.

(57) ABSTRACT

An uplock for use with an aircraft landing gear is disclosed having a hook configured to engage a capture pin mounted on the landing gear. The hook is mounted for movement between a closed and locked position and an open and unlocked position. A proximity detector directly detects whether the pin is "up". An uplock hook sensor detects when the hook is in the closed and locked position. The outputs of the proximity detector and the uplock hook sensor may be used to indicate the "up and locked" condition, i.e., landing gear up, and/or to indicate a fault. Such outputs may be provided by an associated device of an avionics system.

18 Claims, 15 Drawing Sheets

(56) References Cited

U.S. PATENT DOCUMENTS

| | | | | |
|---|---|---|---|---|
| 2015/0266592 A1* | 9/2015 | Mellor | ................... | B64C 25/00 |
| | | | | 701/16 |
| 2019/0061723 A1* | 2/2019 | Slatkin | ................... | B64C 25/42 |
| 2020/0399936 A1* | 12/2020 | Bartola | ................... | E05B 83/24 |

FOREIGN PATENT DOCUMENTS

| | | |
|---|---|---|
| GB | 2561383 | 10/2018 |
| WO | 2005/005252 | 1/2005 |
| WO | 2018/189299 | 10/2018 |

OTHER PUBLICATIONS

Combined Search and Examination Report for GB Application No. 1902529.5 dated Jul. 23, 2019, 5 pages.

* cited by examiner

AIRCRAFT LANDING GEAR UPLOCK SYSTEM

CROSS RELATED APPLICATION

This application claims priority to United Kingdom (GB) Patent Application 1902529.5, filed Feb. 25, 2019, the entire contents of which is hereby incorporated by reference.

BACKGROUND OF THE INVENTION

The present invention concerns an uplock for an aircraft component. More particularly, but not exclusively, this invention concerns an uplock comprising a hook configured to receive a capture pin mounted on the aircraft component to be restrained. Thus, the invention concerns an uplock that holds an aircraft component in position by capturing a capture pin mounted on that component with a hook. The invention also concerns an uplock suitable for use with a retractable landing gear or a folding wing tip device.

Typically, aircraft with retractable landing gear have an uplock which holds the gear in place in the landing gear bay when the landing gear has been retracted. FIGS. 1 and 2 show a schematic drawing of a typical uplock 1 in the (FIG. 1) open and (FIG. 2) locked configuration. The uplock 1 comprises a hook 2 mounted to pivot about a point labelled A in FIG. 1. The hook 2 includes a cam surface 4 at the upper end of the hook 2 and an arm 6 extending out either side of the hook 2. The uplock 1 also comprises a locking lever 8 mounted to pivot about a point labelled B in FIG. 1. A first end of the lever 8 includes a roller 10 which rests on the cam surface 4 of the hook 2 when the uplock is in the open configuration of FIG. 1. At the other end of the lever 8 there is a sensor target 12. In the open configuration of FIG. 1 the sensor target 12 is spaced apart from a proximity sensor 14 mounted on a main body 22 of the uplock 1. The proximity sensor 14 provides a signal to an avionics device 46 shown schematically by a dashed line in FIG. 1. An arm 16 extends from the underside of the lever 8. A spring 18 extends between the hook 2 and the locking lever 8. A hydraulic actuator 20 is positioned adjacent to the locking lever 8. The hook 2, locking lever 8, sensor 14 and actuator 20 are mounted to the main body 22. In FIG. 1 a capture pin 26 mounted on the leg of a landing gear (not shown) is spaced apart from the hook 2, beneath the right-hand side hook arm 6.

In the locked configuration of FIG. 2 the capture pin 26 is engaged with the hook 2 which is rotated anti-clockwise from its position in FIG. 1 to a closed position. The locking lever 8 is rotated clockwise from its position in FIG. 1; the roller 10 of the locking lever 8 is located within a recess 28 in the cam surface 4 of the hook 2 and the sensor target 12 on the lock lever 8 is adjacent to the sensor 14.

In use, when the landing gear is extended the uplock 1 is in the open configuration of FIG. 1, with the hook 2 in the open position and the roller 10 of the locking lever 8 resting on the cam surface 4 of the hook 2. The capture pin 26 is spaced apart from the hook 2 and free to move relative to the uplock 1. As the landing gear retracts the landing gear pin 26 contacts the underside of hook arm 6 pushing it upwards and causing the hook 2 to rotate anti-clockwise about pivot point A. As the hook 2 rotates the cam surface 4 moves relative to the locking lever 8, this relative movement is accommodated by the roller 10 which rolls along the cam surface 4. The roller 10 on the locking lever 8 rolls along the cam surface 4 until it reaches the locking recess 28. As the roller 10 drops into the locking recess 28 the locking lever 8 pivots clockwise about point B, which moves the portion of the locking lever 8 on which the sensor target 12 is mounted towards the sensor 14. As the hook 2 is rotating towards the closed position the tension spring 18 extends. At the end of this process, the uplock is in the locked configuration of FIG. 2 with the target 12 on the locking lever 8 located next to the sensor 14, the hook 2 in the closed position, and the locking lever 8 engaged with the locking recess 28. The capture pin 26 is retained by the hook 2 to prevent movement of the landing gear on which it is mounted. With the target 12 near the sensor 14, the sensor provides a 'locked' signal to the aircraft avionics system 46. The presence of the locking lever 8 in the recess 28 prevents the hook 2 rotating away from the closed position.

To release the landing gear the actuator 20 is engaged and contacts the locking lever 8 at the locking arm 16 causing the locking lever 8 to rotate anti-clockwise and disengaging the locking lever 8 from the locking recess 28. With the locking lever 8 disengaged, the tension spring 18 acts, along with the weight of the landing gear via the pin 26 on the hook 2 to rotate the hook 2 clockwise towards the open position and the pin 26 can move downwards.

In uplocks in accordance with the prior art a 'locked' signal has been taken to indicate that the landing gear (or other component) is both 'locked' and in the fully retracted ('up') position. However, the Applicant has now identified that if there is a structural failure in certain regions of the hook 2, for example the bottom portion of the hook, the pin 26 would be released but the locking lever 8 would remain in the locked position. This gives rise to the potential for a hidden failure mode in which the sensor continues to indicate that the gear is locked when the gear has dropped and is resting on the doors of the landing gear bay. It would be advantageous to provide an uplock in which this type of failure was detected.

WO 2018/189299 proposes various uplock arrangements, in which the uplock incorporates an integrated sensor system for sensing when the hook is closed and the capture pin is captured. The contents of WO 2018/189299 are incorporated herein by reference thereto.

The present invention seeks to mitigate one or more of the above-mentioned problems. Alternatively or additionally, the present invention seeks to provide an alternative uplock system for use with an aircraft component.

SUMMARY OF THE INVENTION

The present invention provides, according to a first aspect, an aircraft comprising a landing gear, a capture pin mounted on the landing gear, an uplock having a hook, a sensor for detecting when the hook is in its closed position (in which it retains the capture pin when the landing gear is stowed—which may for example be a closed and locked position, which may optionally be referred to simply as the "locked" position of the hook) and a proximity detector for detecting, preferably directly detecting, when the landing gear is up. Outputs from the uplock hook sensor and the proximity detector thus enable an assessment to be reliably made as to whether both the hook is in its closed position and the capture pin is in its captured position. In embodiments of the invention, the aircraft includes apparatus enabling the UP and LOCKED condition of a landing gear to be reliably confirmed. This may allow the detection of a previously hidden failure mode in which the hook (or the remnants thereof) remains in the closed position, but fails structurally such that the capture pin is released from the uplock.

The landing gear is in the form of a retractable landing gear mounted for movement between a deployed position and a stowed position. The landing gear may for example be stowed in a landing gear bay. The landing gear may be a main landing gear or nose landing gear. The landing gear may be mounted on the fuselage or a wing of the aircraft. The landing gear may be, or form part of, a landing gear assembly of the aircraft.

The uplock is configured to be able to lock the landing gear in the stowed position. The hook of the uplock is configured to move between a closed position and an open position. In the closed position, the hook retains the capture pin in a captured position thus preventing the landing gear from moving away from its stowed position. When the hook is in its open position, movement of the capture pin from the captured position is permitted, thus allowing the landing gear to move away from its stowed position.

The proximity detector may comprise a target and a sensor. One of the target and sensor may be mounted on the landing gear, and the other of the target and sensor may be mounted in the landing gear bay, for example on the uplock. The arrangement is such that the sensor detects (e.g. senses) the target when the landing gear is stowed with the capture pin in its captured position.

The aircraft may comprise a signal processing unit, which is arranged to receive an input from the uplock hook sensor, and/or to receive an input from the proximity detector. Such a signal processing unit may also produce an output indicating if both the hook is in its closed position and the capture pin is in its captured position. The signal processing unit may form part of a computer, for example an on-board pre-programmed computer processor. The signal processing unit may form part of a circuit. For example, the signal processing unit may comprise an AND gate. The signal processing unit may be arranged to communicate with, or form a part of, an avionics system of the aircraft. The signal processing unit may produce a certain output indicating that the hook is in its closed position and the capture pin is in its captured position and may produce a different output in the event that the capture pin is not in its captured position (particularly in the case when the hook is in its closed position). One state of the capture pin and/or one state of the hook may be indicated by a null output, zero output or no output of the signal processing unit. The signal processing unit may be provided in the form of electronic means for receiving an input from the uplock hook sensor, for receiving an input from the proximity detector, and for producing an output indicating if both the hook is in its closed position and the capture pin is in its captured position.

The uplock may comprise a housing. The housing may accommodate at least part of the uplock hook. The housing may be in the form of an exterior casing. The uplock may comprise a recess (a pin recess) configured to receive the capture pin. The recess may be formed in the main body of the uplock. The recess may be defined by a housing of the uplock. The recess may comprise an opening via which, in use, the pin enters the recess. The hook may extend across at least a portion of the opening when the hook is in the closed position. The hook may extend across a smaller portion (or none) of the opening when the hook is in the open position.

The hook and/or the uplock hook sensor may be mounted at least partially within the housing. The housing may comprise one or more mounting points for mounting the uplock to an aircraft structure, for example a portion of the airframe. Thus, the uplock may comprise at least one mounting point for mounting the uplock to the aircraft.

The target of the proximity detector may be mounted on structure of the landing gear. The sensor of the proximity detector may be mounted on the exterior of the uplock, for example on the outside of the uplock housing (e.g. on an exterior casing of the uplock—the sensor for example being mounted on the side of the exterior casing).

The sensor of the proximity detector may be mounted on the structure of the landing gear. The target of the proximity detector may be a part of the uplock, for example a part of the uplock hook. The target of the proximity detector may mounted on a part of the uplock.

The target of the proximity detector may be in the form of a plate mounted on a bracket which is mounted on one of the landing gear and the uplock. The target may comprise a flat plate. The target may comprise a plate having a concave shape. The target may comprise a plate shape that corresponds to the likely locations of the sensor in those positions which correspond to the landing gear being in the up position. Having a shape of target that can be set to suit the likely variation in position of the sensor of the landing gear allows more accurate and reliable detection of the sensor. In a typical embodiment there is not just one position of the landing gear relative to the rest of the aircraft which corresponds to the up and locked position.

The proximity detector may be arranged to generate an output signal indicating that the capture pin is in its captured position if the minimum distance between the target and the sensor is less than 10 mm, preferably less than 5 mm, possible 2 mm or less. For example, it may be that if output from the proximity detector indicates that the capture pin is in its captured position it may be assumed with confidence that distance between the target and the sensor is less than the aforementioned values.

It may be that the proximity detector is arranged to generate an output signal indicating that the capture pin is not in its captured position (or not to generate an output signal indicating that the capture pin is in its captured position) if the minimum distance between the target and the sensor is greater than 20 mm, and possibly if the distance is greater than 10 mm, and optionally if the distance is greater than 5 mm.

The proximity detector may have a binary output, which depends on whether the target is detected by the sensor or not. The sensitivity of the proximity detector may be less than 10 mm, and possibly less than 5 mm (i.e. it may be that the proximity detector is only triggered if the target is located at that distance or nearer relative to the sensor).

The sensor of the proximity detector may comprise a variable reluctance device. In such a case, the target will need to comprise ferromagnetic material.

Signals from the proximity detector, may (possibly before being processed further and possibly after being processed further) be sent over an avionics network of the aircraft. The aircraft to which the uplock is mounted may comprise an avionics system. As mentioned above, the signal processing unit may form part of an avionics system. Signals from the uplock hook sensor and the proximity detector may be provided to such a signal processing unit via an avionics data network. The uplock may be configured to provide signals from one or more sensors to the avionics system. The signal(s) may correspond to the position of one or more of the hook, the presence of the landing gear in the stowed position, the presence of the landing gear in the up position.

The signal processing unit may be arranged to combine the signals from the uplock hook sensor and the proximity detector and then send the output via an avionics data network to an avionics system of the aircraft. The combining of the signals may comprise performing a logical "and" operation on them. The signal processing unit may be arranged to produce an output indicating if both the hook is in its closed position and the capture pin is in its captured position.

It may be that the hook can be further locked in its closed position. In such a case, it may be that for an uplock to be 'safe' three criteria must be met; (i) the hook must be closed, (ii) the hook must be locked in the closed position and (iii) the capture pin must be received in the hook (or, alternatively or equivalently, the landing gear is in its "up" position). (Optionally, references herein to the hook being in its "closed position" may be read as referring to the hook being in its "closed and locked position".) The avionics system may be configured to provide a safe signal only when all three criteria are met. It may be that the hook can only be locked when closed, in which case, the closed criterion of the hook is implicitly met when the hook is locked. It may be that separate signals corresponding two or three of these criteria are provided separately to the avionics system. For example there may be three separate signals, namely a (hook) closed/open signal, a (hook) locked/unlocked signal and a (capture pin/landing gear) up/down signal. It may be that the signals corresponding to these criteria are combined before being provided to the avionics system. The avionics system may be configured to determine whether the uplock is safe/not-safe in dependence on the signals so received. Alternatively, the uplock may be configured to provide a single signal to the avionics system; a safe/not-safe signal. It may be that a safe signal is only provided when all relevant criteria are met, and otherwise a not-safe signal is provided. The avionics system may be arranged to provide an alert to the pilot. An alert may be provided to the pilot when a not-safe signal is provided (or at least when a not-safe signal is provided in the case where the landing gear has been and/or is being retracted), for example. The alert to the pilot may depend on the output indicating if both the hook is in its closed position and the capture pin is in its captured position. The avionics system may be configured to provide an alert to the pilot when it is determined that there may be a fault with the uplock.

The uplock may be mounted to aircraft structure, for example aircraft structure forming part of the landing gear bay. Such aircraft structure may be form part of the fuselage structure. Such aircraft structure may be form part of the wing structure. The uplock may be mounted to aircraft structure via at least one spherical bearing which permits relative movement of the uplock with two degrees of freedom. The uplock may be mounted to aircraft structure via at least one variable length strut. Such a strut may include a hydraulic dampener. Such a strut may include a spring. Such a strut may have a length corresponding to a neutral position and be arranged such that when the strut is moved from its neutral position, a force acts to return the strut to its neutral position. The mounting of the uplock to its surrounding aircraft structure in this manner may assist with dealing with the loads and relative movement that might otherwise arise, as between the landing gear and the uplock, resulting from wing flexure for example, in the case where the landing gear is a wing-mounted landing gear.

There may be more than one uplock hook sensor for detecting when the hook is in its closed position, but it is preferred for there to be only one. There may be more than one proximity detector for detecting when the capture pin in its captured position. For example, there may be a first such proximity detector arranged on one side of the uplock and a second such proximity detector arranged on the opposite side of the uplock (spaced apart in a direction parallel to the axis of the capture pin for example).

The sensor of the proximity detector may provide its output to a signal processing unit, an avionics systems or any other electronic device on the aircraft via a cable, for example including one or more current-carrying wires. Such a cable may be mounted on, for example harnessed to, structure of the aircraft. In the case where a sensor of the proximity detector is arranged on the landing gear, the landing gear may include a wiring harness for accommodating a cable for carrying signals from the sensor.

The aircraft may be a commercial passenger aircraft, for example an aircraft capable of carrying more than fifty passengers, for example more than one hundred passengers.

According to a second aspect of the invention there is provided an up and locked detector system for an aircraft. The apparatus of such a system is arranged to receive a first input from an uplock indicating whether the uplock is in a locked configuration. The apparatus of such a system is arranged to receive a second input from a proximity sensor arranged to detect, preferably directly detect (e.g. without mechanical levers or other indicator devices, other than one or more sensor-target based proximity detectors), whether a landing gear is in an up position. The apparatus of such a system may be arranged to process the first and second inputs and produce one or more outputs indicating whether, or not, the uplock is in the locked configuration and the landing gear is in the up position. For example, the first and second inputs may be combined with an AND gate, or equivalent, to produce a single such output.

In another aspect of the invention there is provided a corresponding method of the invention.

The method may be performed to detect a fault in an uplock for a landing gear. The method may comprise determining whether a fault has occurred in dependence on whether a landing gear capture pin is engaged in a hook of the uplock when the hook is in a closed position, and, in the case that the pin is not engaged in the hook, providing an alert to the pilot of a possible uplock fault. Determining whether a pin is present in the hook when the hook is in the closed position may facilitate the identification of failure modes that were not detectable in prior art uplocks.

The method may be performed to detect whether an aircraft landing gear is securely retained by an uplock arrangement. The method may comprise using both a first signal and a second signal to assess whether the landing gear is securely retained by the uplock arrangement. The first signal may be an output from the uplock arrangement, the output depending on whether a hook of the uplock arrangement is in a closed configuration. The second signal may be an output from a proximity sensor, which detects the position of the landing gear, for example determining whether the landing gear is in its "up" position (e.g. in a position in which it can be securely retained in the uplock arrangement), or not. There may be a step of electronically combining the first signal with the second signal to provide a third signal from which third signal it can be ascertained whether or not the landing gear is securely retained by the uplock arrangement. The method may comprise providing an alert to the pilot, for example if a fault is detected and/or the aircraft landing gear is deemed not to be securely retained by the uplock. The method may comprise providing a signal to an avionics system of the aircraft, for example indicating the configuration of the hook (locked/unlocked) and/or the landing gear/capture pin (up/not up) as described above. There may be a "hook locked" or a "hook unlocked" signal, depending on the position of the hook. The hook locked signal may comprise a signal that a target associated with the uplock hook movement is near to a proximity sensor, and the hook unlocked signal may comprise a signal that a target associated with the lock member is far from a proximity sensor (or vice versa). The uplock may be configured such that the 'locked' signal is only provided when the hook is both deemed closed and locked in the closed position. The uplock may be configured such that at all other times an 'unlocked' signal is provided. It may be that the uplock is configured such that a lock member for locking the hook can only engage the hook when the hook is in the closed position, in which case a signal indicating the lock or lock member is in the locked position may also implicitly indicate that the hook is in the closed position. It may however be that a first signal indicating the position of a lock member and a second signal indicating the position of the hook are each provided to the avionics system. The method may comprise providing a signal to the avionics system indicating whether a pin is engaged in the hook, e.g. 'pin up' (held) or 'pin down'. The pin up signal may comprise a signal that a target associated with the landing gear proximity sensor is near to the sensor and/or the pin down signal may comprise a signal that the target is far from the sensor. The uplock may be configured such a 'pin up' signal is provided, and is only provided, when a pin is engaged in the hook when the hook is in the closed position. The uplock may be configured such that at all other times a 'pin down' signal is provided. The method may comprise providing an alert to the pilot if the signals indicate that the hook is locked but the pin is not engaged in the hook, e.g. 'locked' and 'pin down'. A single signal indicating that the hook is locked in the closed position and the pin is engaged in the hook may be provided to the avionics system. Alternatively, two separate signals may be provided to the avionics system; one indicating that the hook is locked in the closed position and another signal indicating that a pin is present in the hook. Alternatively, three separate signals may be provided to the avionics system; a first signal indicating that the hook is locked, a second signal indicating that the hook is in the closed position and a third signal indicating that a pin is present in the hook.

In another aspect of the invention, there is provided a kit of parts for putting into effect any of the aspects of the invention, or embodiments relating thereto, described herein. The kit may comprise an uplock. The kit may comprise a proximity sensor for directly detecting the position of part of a landing gear. The kit may comprise an avionics systems or a part thereof. The kit may be adapted for use with the aircraft as described or claimed herein with reference to the present invention or embodiments thereof. The kit may be adapted for use with the up and locked detector system as described or claimed herein with reference to the present invention or embodiments thereof. The kit may be adapted for use with the method as described or claimed herein with reference to the present invention or embodiments thereof.

In another aspect of the invention there is provided an avionics system configured for use as the avionics system of any other aspect of the present invention or embodiments thereof.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 2:
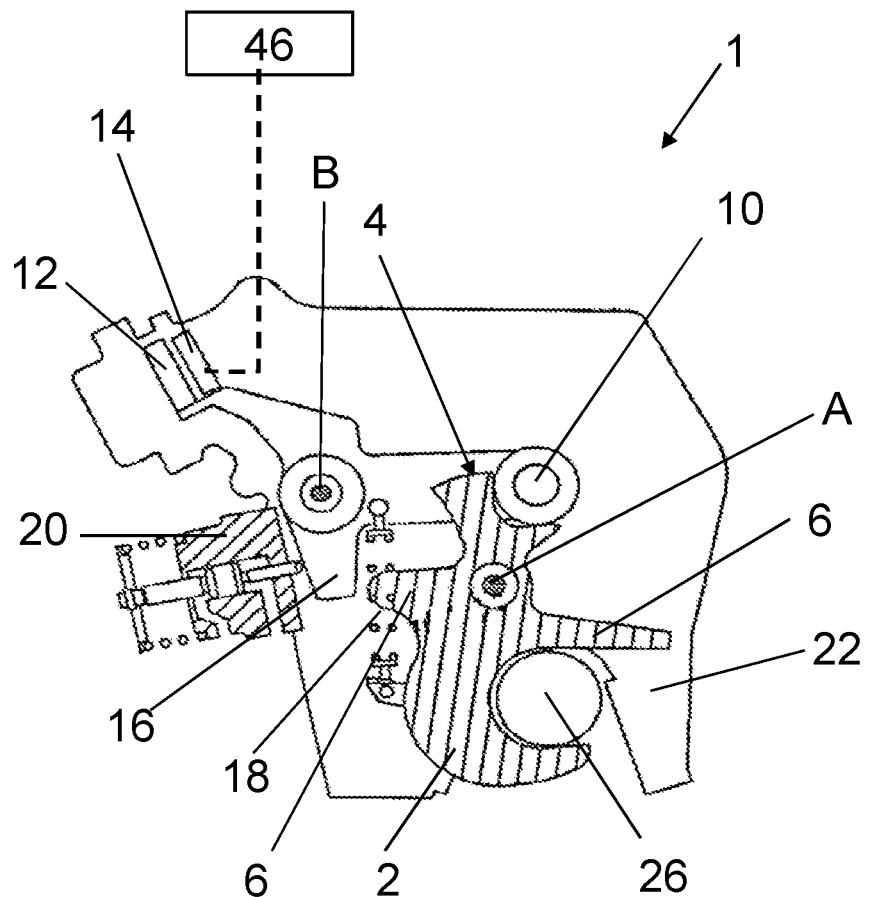
FIG. 2 shows a schematic view of the prior art uplock of FIG. 1 in the locked configuration.
Figure 3:
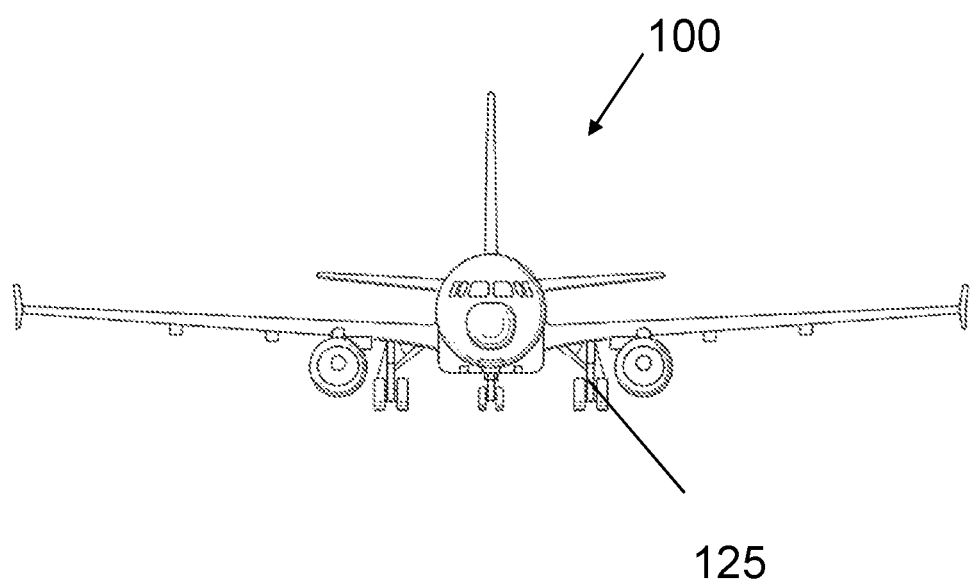
FIG. 3 shows a schematic view of an aircraft including a landing gear uplock according to a first example embodiment of the invention

FIG. 3 shows an aircraft 100 comprising a retractable landing gear 125 having a capture pin 126 (not shown in FIG. 2) mounted thereon, and an uplock 101 (not shown in FIG. 3) and an avionics system (not shown in FIG. 3) in accordance with a first example embodiment of the invention. The landing gear 125 is mounted for movement between a deployed (i.e. extended) position and a stowed (i.e. retracted) position. The landing gear 125 when retracted is stowed in a landing gear bay of the aircraft (not shown). Retractable landing gear are well known in the art and will not be described further here.

Figure 1:
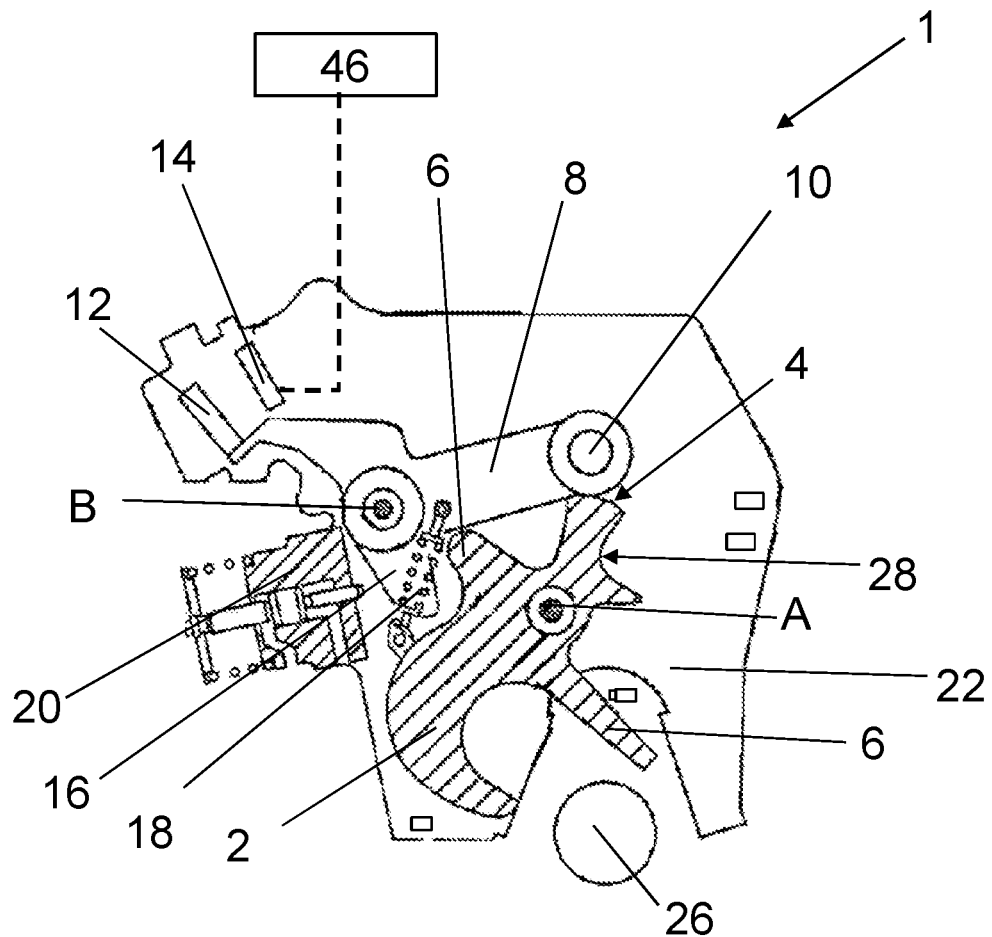
FIG. 1 shows a schematic view of a prior art uplock in the open configuration.
Figure 4:
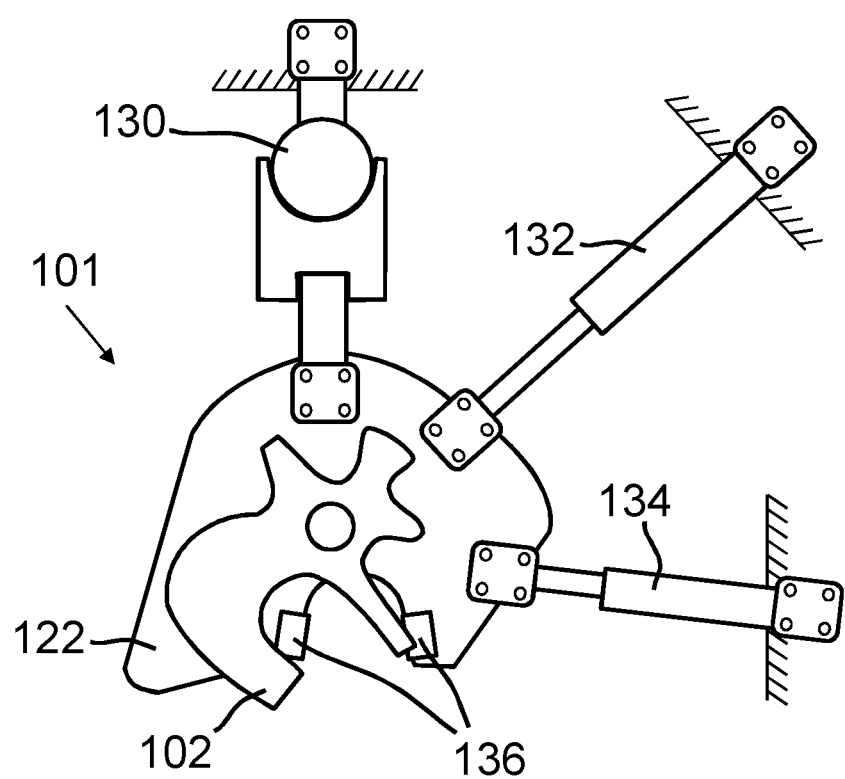
FIG. 4 shows a schematic view of the uplock of the first example embodiment.

FIG. 4 shows a schematic view of a landing gear uplock 101 according to the first embodiment in an open and unlocked configuration. The uplock 101 has a main body 122 which is mounted to structure in the landing gear bay via a spherical bearing 130 and two sprung struts 132, 134 of variable length. This means of mounting of the uplock 101 allows for movement and flexure of the wings of the aircraft in flight to be accommodated without imposing unduly high loads on the uplock. Such load might otherwise be caused, as the landing gear moves relative to the uplock as a result of such movement/flexure. The uplock also includes guide plates 136 for guiding passage of the pin 126 into the uplock. The uplock 101 is otherwise very similar to the uplock 1 shown in FIGS. 1 and 2. As such, like reference numerals denote like elements (for example the uplock of FIG. 1 is labelled with reference numeral 1 and the uplock of FIG. 3 is labelled with reference numeral 101). It will be appreciated that an uplock contains other elements not shown here for the sake of clarity.

Figure 5:
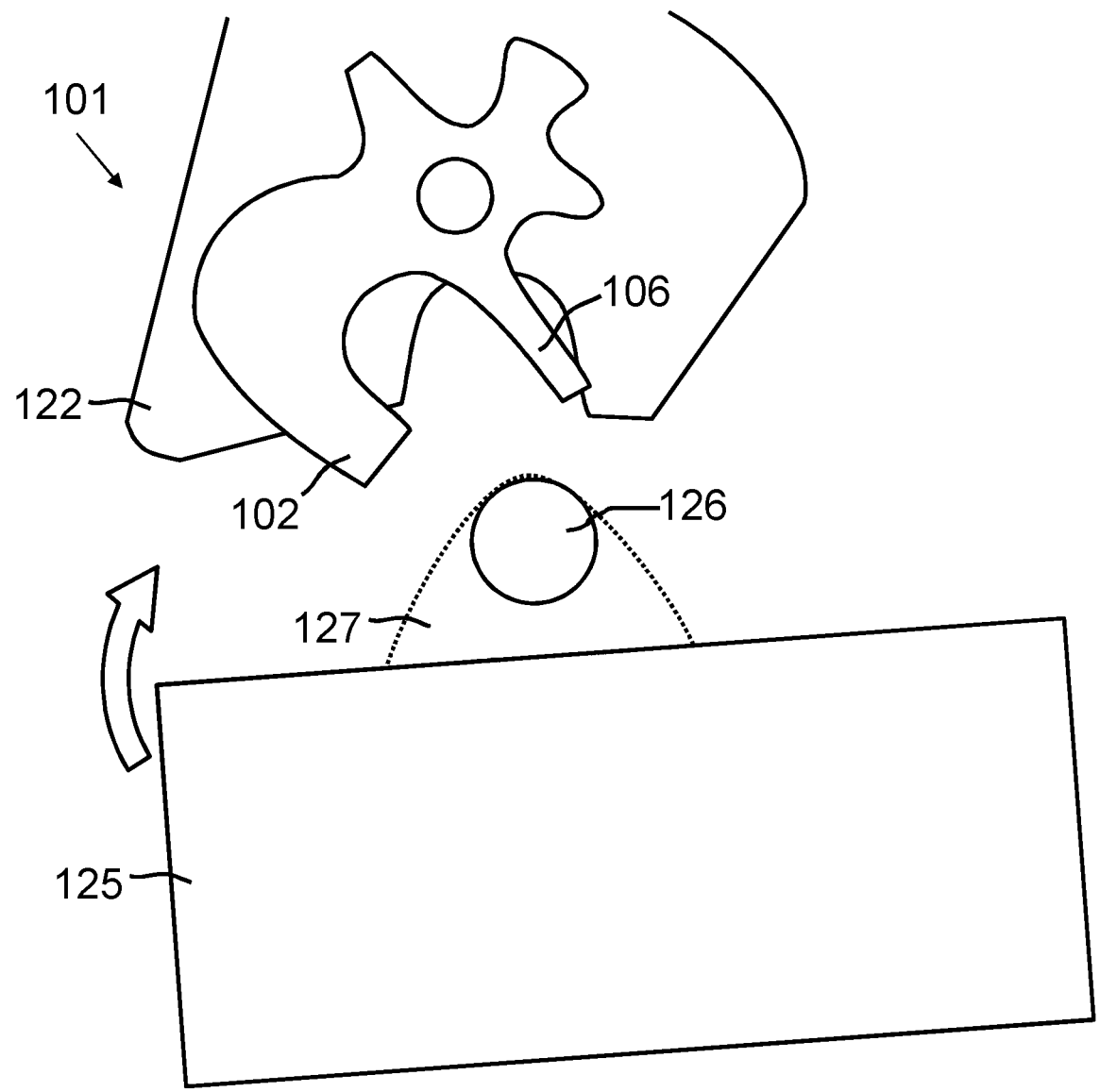
FIGS. 5 to 7 show schematic views of the uplock of the first example embodiment in an open configuration, a semi-closed configuration and a locked configuration, respectively.
Figure 6:
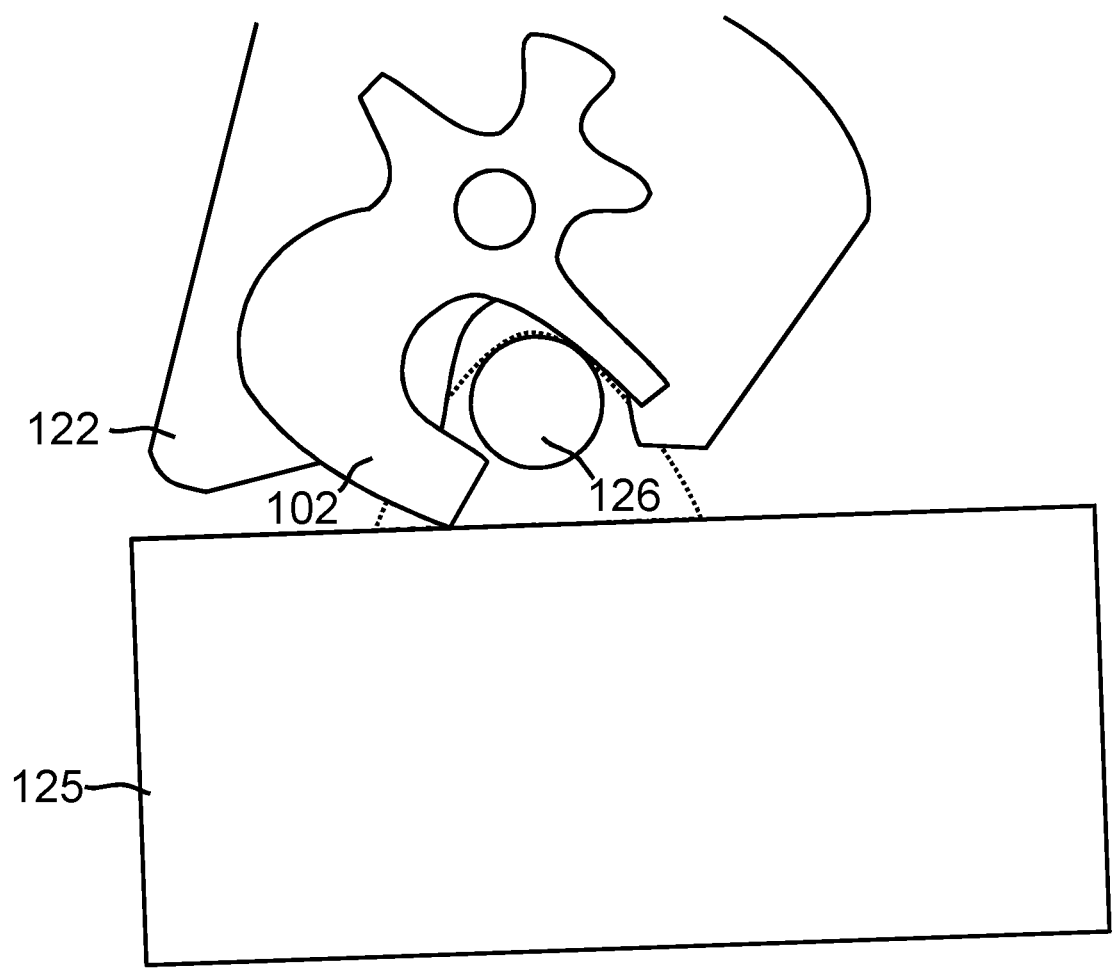
Figure 7:
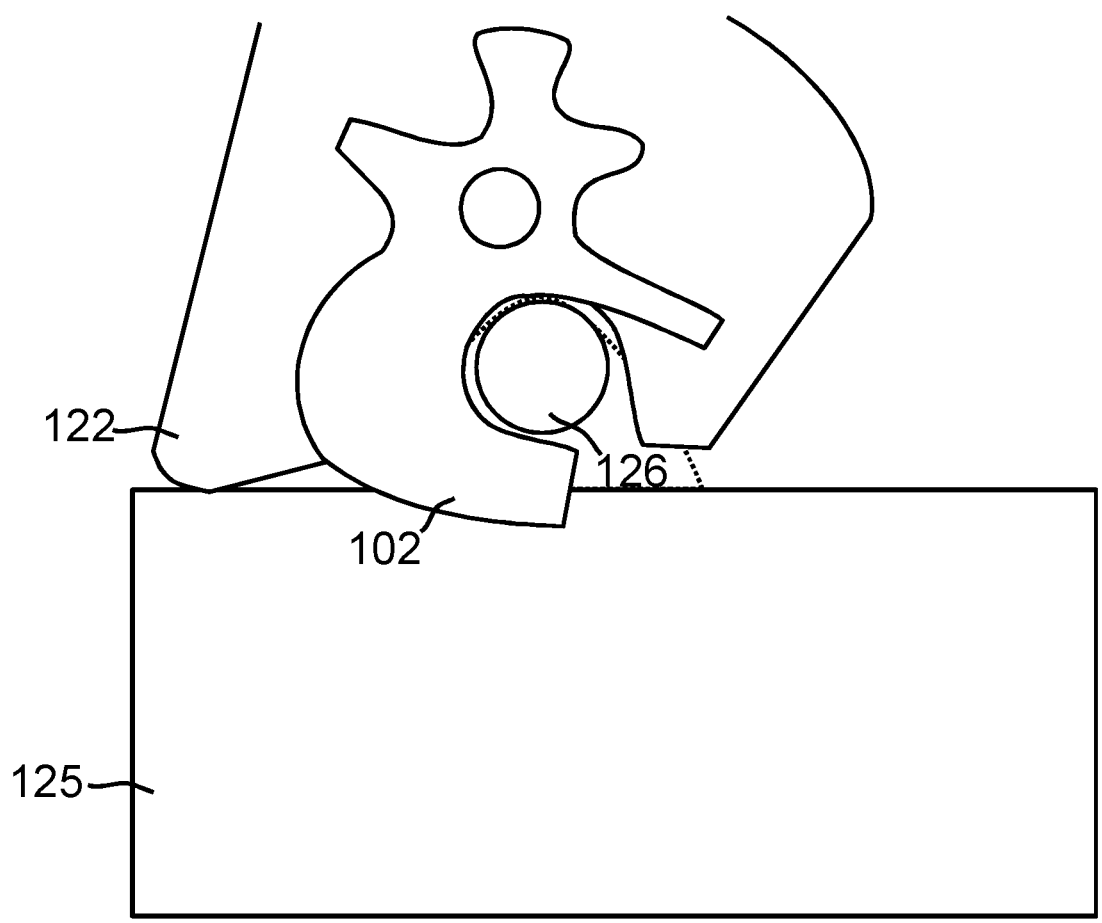

FIGS. 5 to 7 show the movement of the landing gear 125 (illustrated schematically only) towards its stowed position within the uplock. FIG. 5 shows the landing gear approaching the uplock as it swings up during the retraction process. The capture pin 126 is mounted between two plates 127 at either end of the pin. The rearward plate 127 is shown in the Figures with a dotted line. The outline of the uplock hook 102, hook arm 106, and associated structure, are all shown in FIGS. 5 to 7.

With reference to FIG. 6, as the capture pin 126 contacts with the underside of the hook arm 106, the hook 102 rotates anti-clockwise from its position in FIG. 5. As the landing gear and capture pin continue to rise and move towards the uplock, the hook 102 rotates further anti-clockwise to the position shown in FIG. 7, in which the hook is in its closed position and the capture pin is captured. The sensor 114 (not shown in FIG. 7) outputs a signal indicating that the hook is closed (a 'locked' signal).

Figure 8:
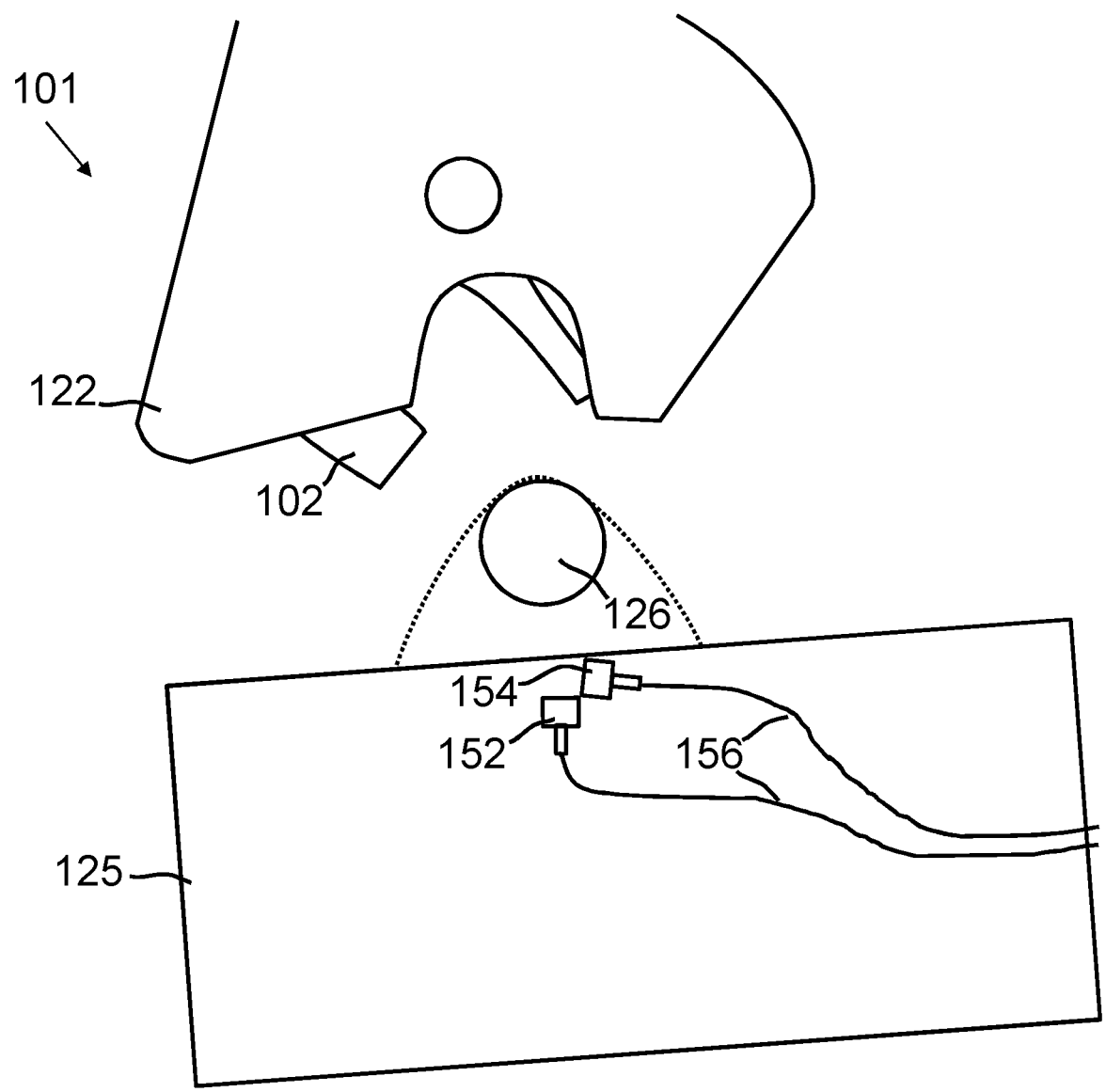
FIGS. 8 to 10 show further schematic views of the uplock of the first example embodiment in the configurations corresponding to FIGS. 5 to 7, respectively.
Figure 9:
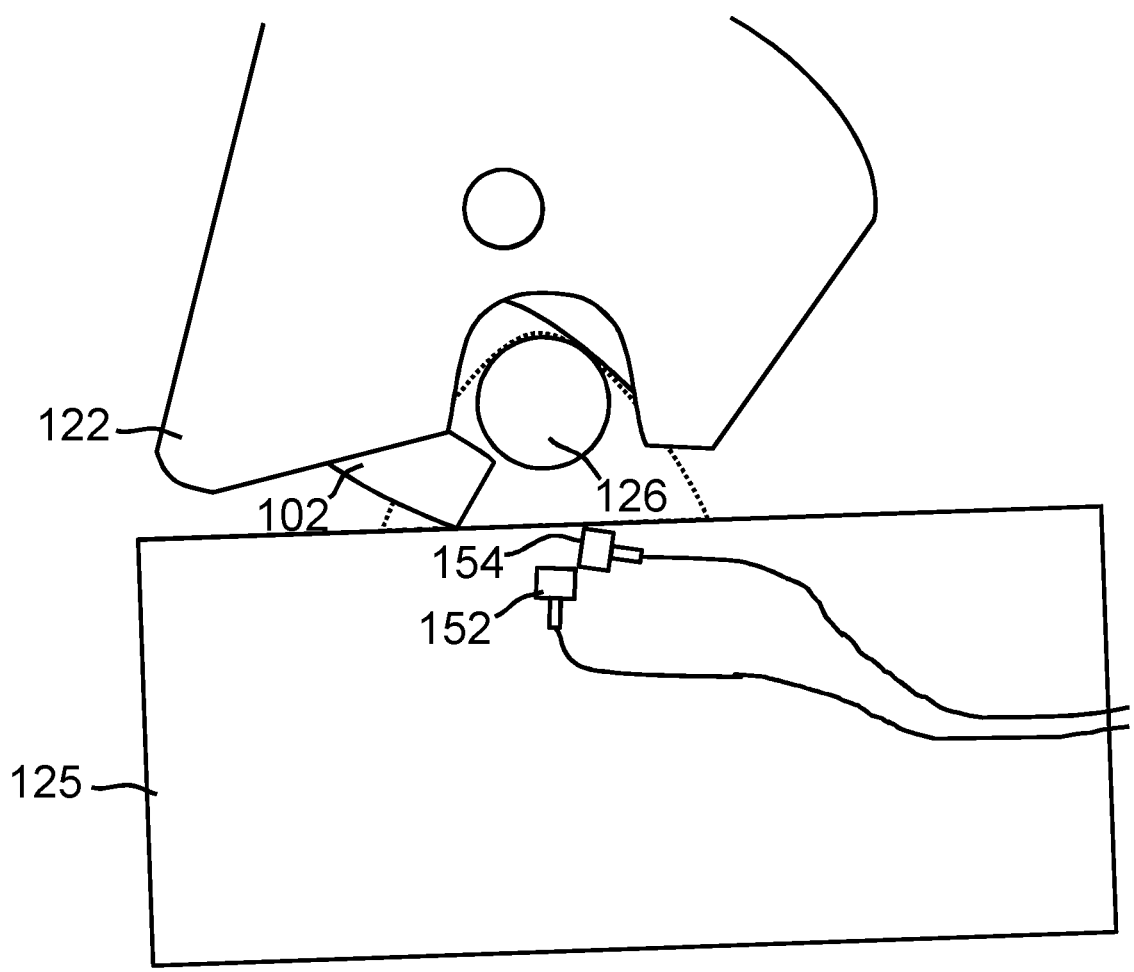
Figure 10:
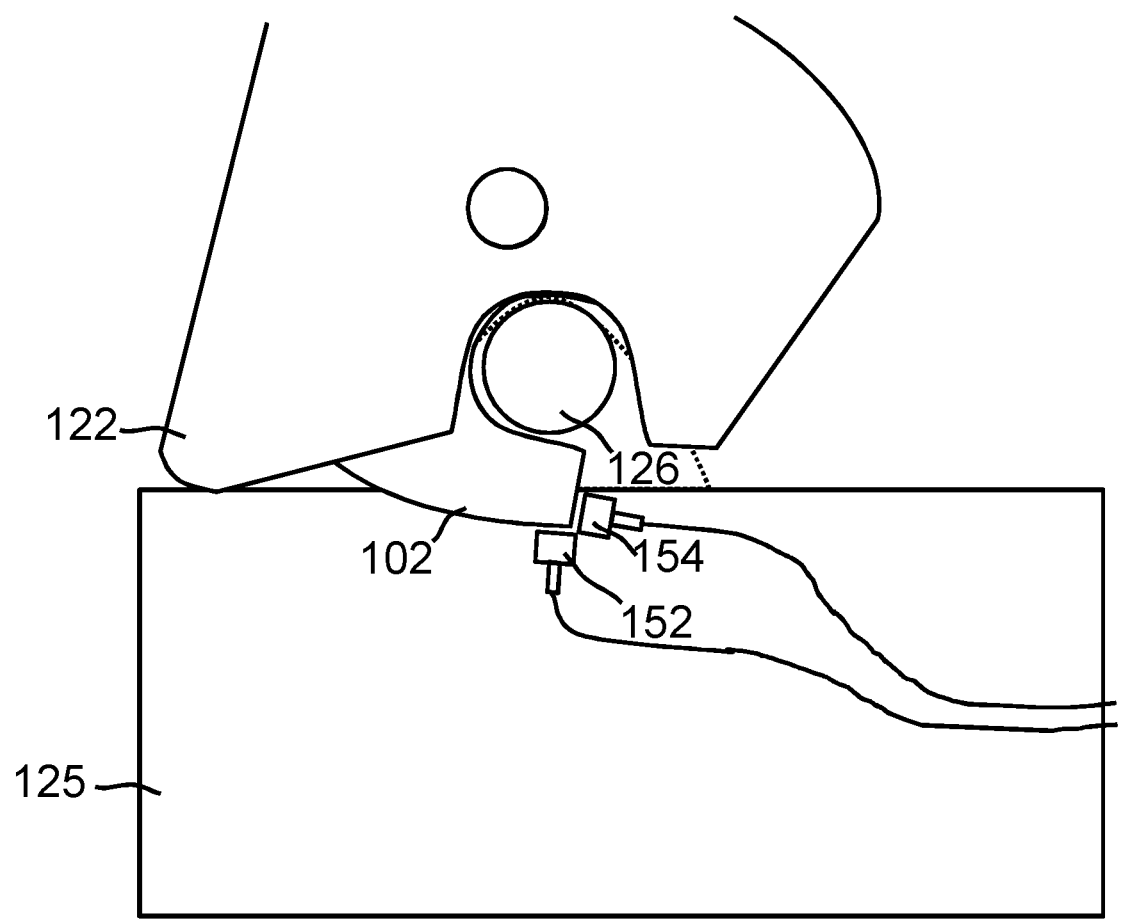

FIGS. 8 to 10 show an "up" detection system according to the first embodiment moving to the fully stowed (up and locked) configuration. FIGS. 8, 9 and 10 show the same positions of the uplock as shown in FIGS. 5, 6, and 7, respectively, but without the full outline of the uplock hook (much of the associated structure being hidden from view behind the casing of the uplock).

The landing gear 125 has mounted on it two proximity sensors 152, 154, arranged in a fixed orientation (at least during use) relative to the landing gear leg. The proximity sensors are located to detect the presence of the hook 102 of the uplock 101 when the landing gear is in the fully retracted and stowed position (the "up" position). Cables 156 carry signals from the sensors 152, 154 to avionics equipment (not shown). The sensors 152, 154 work by detecting changes in a magnetic field, and are therefore able to detect the movement of, in particular, ferromagnetic material into proximity with the sensor. The uplock hook being made of hardened steel (for example, MLX®17 steel—XCrNiMoAlTi12-11-2—available from Aubert & Duval), is therefore able to provide a suitable target of itself.

The sensitivity of the sensors is such that when the separation of the hook from the sensor is greater than 5 mm then the output of the sensor (or absence of an output from the sensor) indicates that the presence of the hook is not detected; and when the separation of the hook from the sensor is less than 5 mm then the sensor reliably gives an output indicating that the presence of the hook is detected. When the sensors 152, 154 fixedly mounted on the landing gear detect the tip of the hook 102, the landing gear must be fully stowed and the capture pin must be in its captured position within the uplock (as can be seen in FIG. 10). It will be noted that the sensors 152, 154 on the landing gear directly detect the tip of the hook 102, and are not for example arranged to detect the presence of the landing gear indirectly, for example by means of detecting the position of another moveable part, such as a lever or the like, which is moved only when the landing gear is fully stowed.

Figure 11:
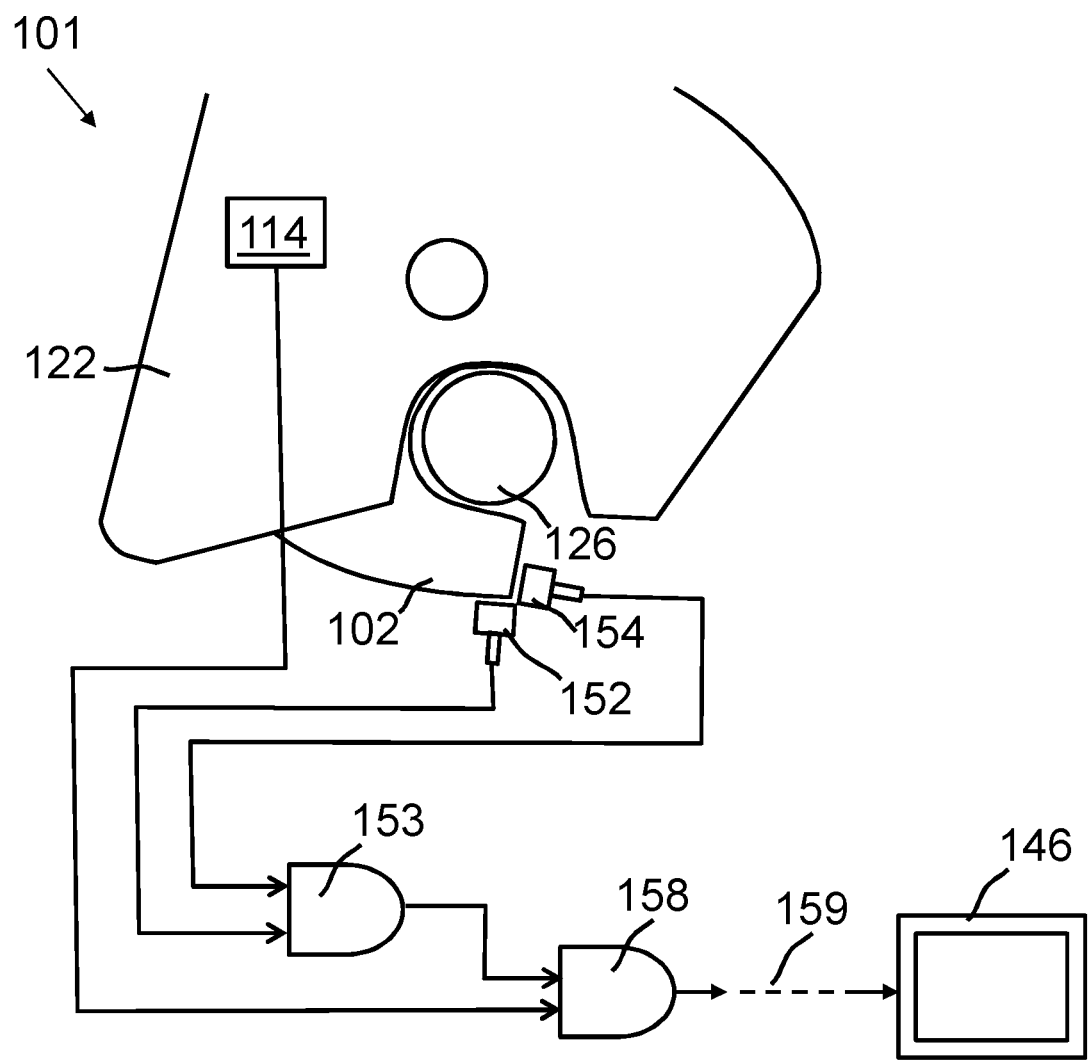
FIG. 11 is schematic diagram showing how various signals are processed in the first example embodiment.

FIG. 11 shows how the signals from the various sensors are used in relation to the first embodiment. The output from the locking sensor 114 of the uplock 101 is a logic "1" when the hook is in its locked position, and logic "0" otherwise. The outputs from the sensors 152, 154 are each logic "1" when the landing gear is fully "up" with the capture pin capture in the uplock, and the tip of the hook 102 is intact. The signals from the sensors 152, 154 are combined in an AND gate 153. The output from AND gate 153 is combines with the signal from the locking sensor 114 in a further AND gate 158. That signal is therefore a logic "1" only when all three sensors are triggered. A logic "1" signal from AND gate 158 can be treated as a robust confirmation both that the landing gear is "UP" and that the hook has "LOCKED" the capture pin in position. An avionics computer (with integrated signal processing units) 146 is arranged to receive the output from the AND gate 158 via an avionics network illustrated by dashed line 159. It will of course be appreciated that the same overall function can be provided despite making various changes to the first embodiment. For example, all three sensors 114, 152, 154 could instead send their outputs over the avionics network for processing by an avionics control unit, computer processor or the like. Additionally or alternatively only one AND gate could be provided taking all three inputs from the sensors. Alternatively, the pilot could be presented with indications of two outputs, one confirming the "UP" condition, the other confirming the "LOCKED" condition. Additionally or alternatively, the pilot could be presented with a warning in the event that the locking lever sensor indicates 'locked' but the landing gear sensors are not indicating 'up'. This could be symptomatic of a potential uplock failure.

Uplocks in accordance with the present embodiment would detect the previously hidden failure mode whereby the hooked portion of the hook 102 fails, but the remains of the hook 102 stay in the closed position and therefore the locking lever 108 (shown in FIGS. 1 and 2 only) remains in the locked position, so that the locking sensor 114 still indicates 'locked'.

Figure 12:
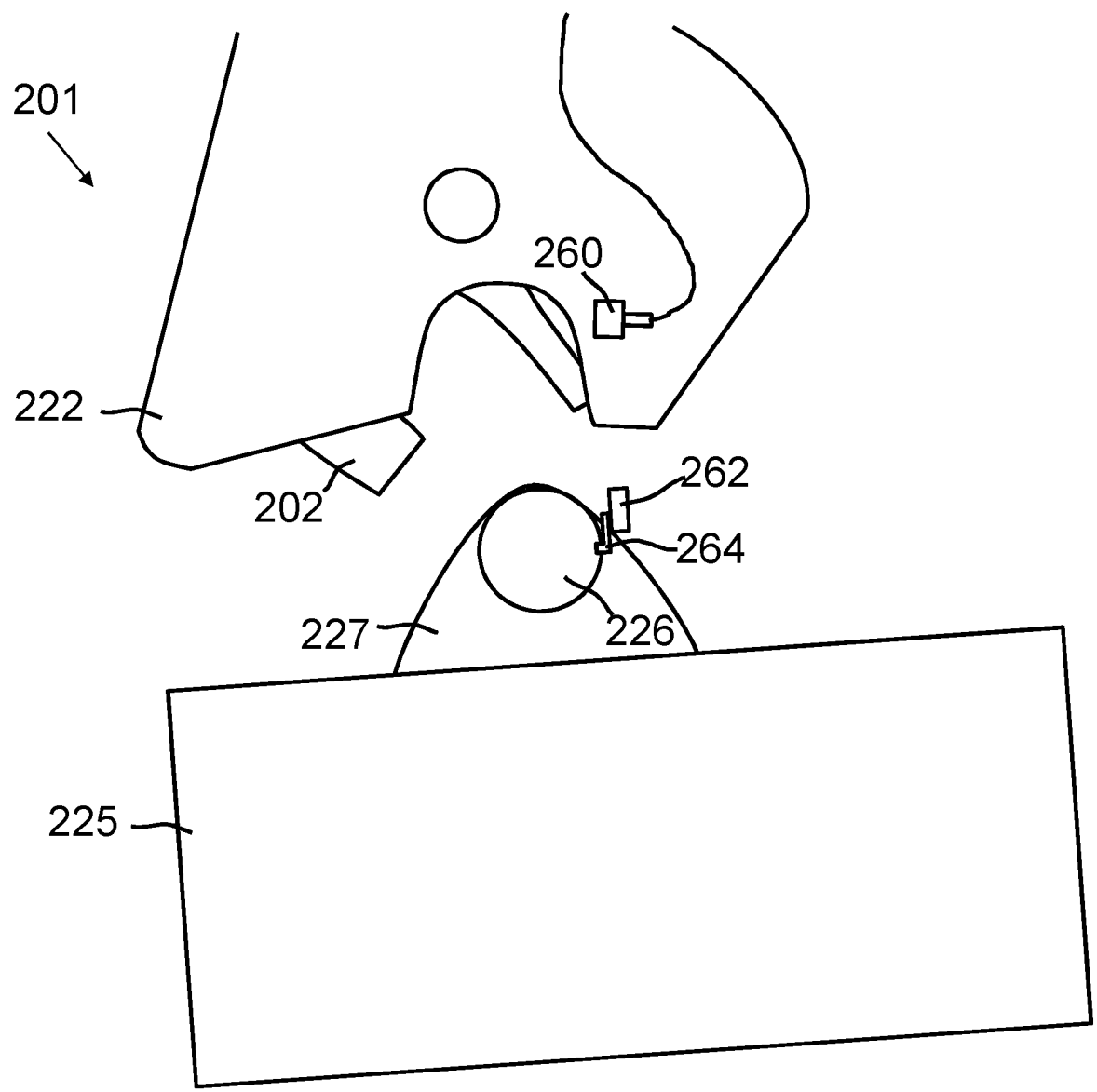
FIGS. 12 to 14 show schematic views of an uplock of a second example embodiment in an open configuration, a semi-closed configuration and a locked configuration, respectively.
Figure 13:
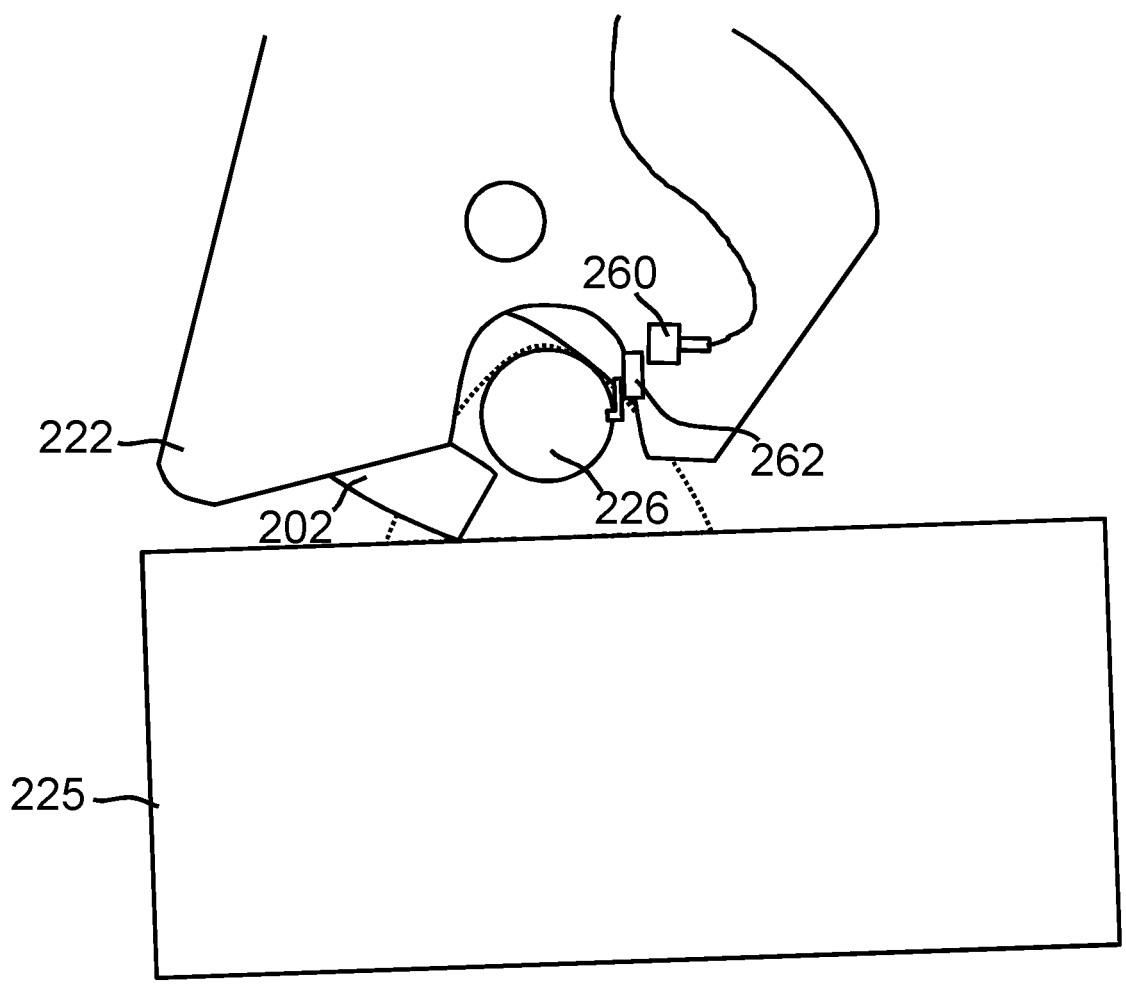
Figure 14:
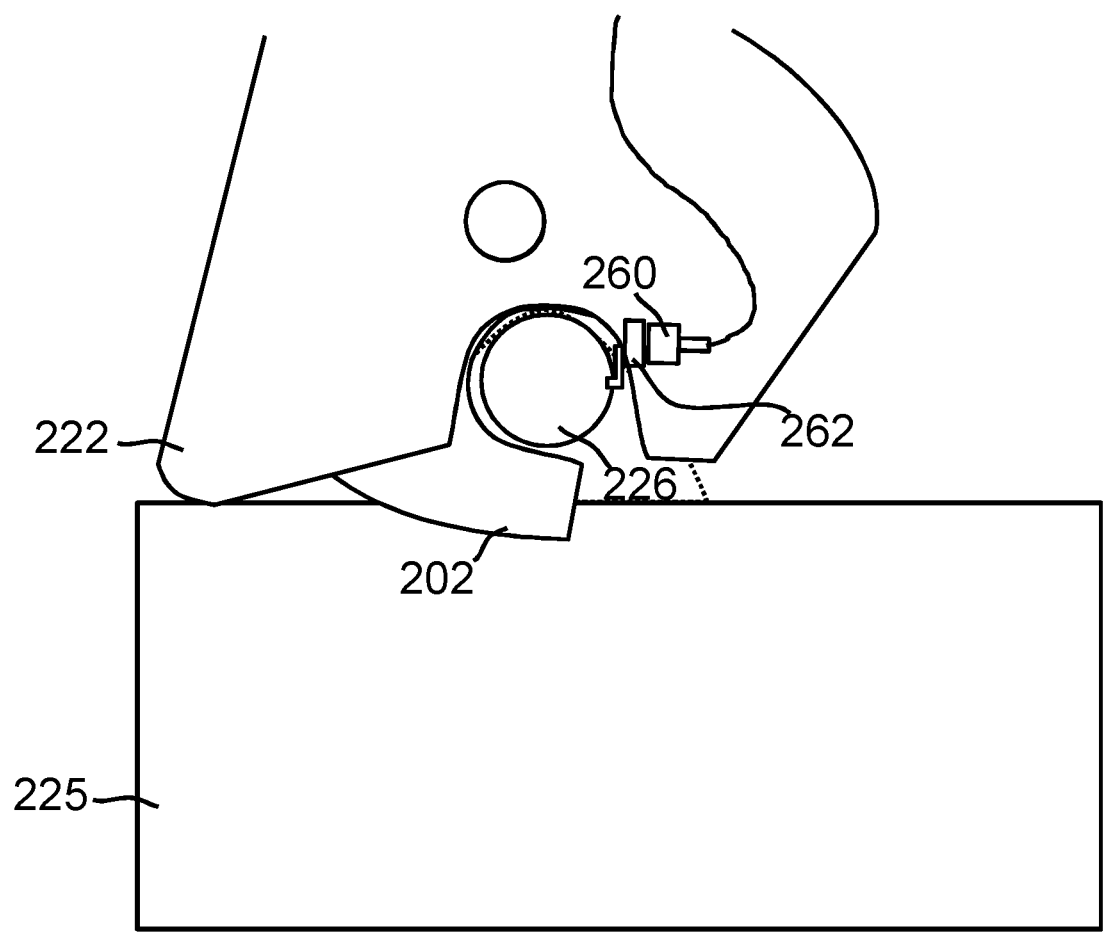

FIGS. 12 to 14 show an uplock 201 and landing gear assembly in accordance with a second example embodiment. FIGS. 12, 13, and 14 show the same positions of the uplock hook and landing gear as shown in FIGS. 8, 9 and 10, respectively. As such, like reference numerals denote like elements (for example the uplock and hook of the first embodiment are labelled with reference numerals 101 and 102 and the uplock and hook of the second embodiment are labelled with reference numerals 201 and 202). Only those elements of the second embodiment which differ with respect to the first embodiment will be described here.

In this second embodiment, two bespoke targets are provided, one (target 262) being mounted on a bracket 264 on the plate 227 which holds the capture pin 226, the other target (not shown) being mounted on a bracket (not shown) on the other plate. The targets are each made from 17-4 PH stainless steel, which is available from AK Steel. A proximity sensor for detecting the presence of each target is provided on the uplock, itself (only one such proximity sensor being shown in the FIGS.). The uplock comprises an exterior casing which houses the hook 202. A proximity sensor 260 is mounted on the side of the exterior of the casing of the uplock 201 for detecting the presence of its paired (corresponding) target 262. It will be seen that as the landing gear moves towards the uplocks (FIGS. 12 to 14 in series), the target 262 moves towards its corresponding sensor 260. FIG. 14 shows the landing gear in the up and locked position. It will be seen that the proximity sensor 260 is aligned with the target 262. Being able to provide a target and sensor arrangement that is designed specifically for the purpose of detecting when the landing gear is up, allows the shape of the target to be designed to enable the sensor to reliably detect the up condition whilst taking into account the movement between landing gear and uplock that occurs as a result of wing flexure, and other in-flight loads/movement. In this case, the sensitivity of the sensors is such that when the separation of the target plate from the sensor is significantly greater than 5 mm (say >10 mm) then the output of the sensor (or absence of an output from the sensor) indicates that the presence of the target is not detected; and when the separation of the target from the sensor is less than 5 mm then the sensor reliably gives an output indicating that the presence of the target is detected.

Figure 15:
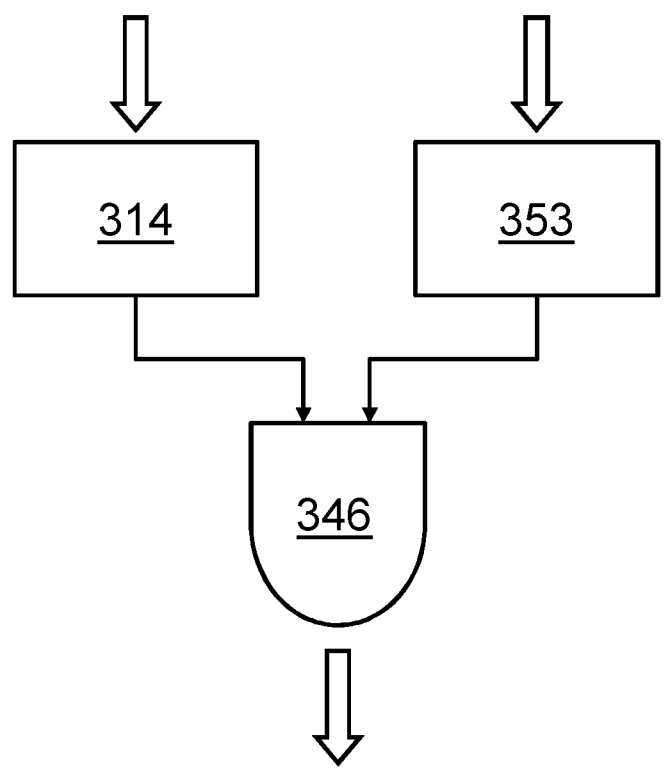
FIG. 15 is a schematic flowchart of the method according to a third example embodiment.

FIG. 15 shows a flowchart illustrating schematically a method, according to a third example embodiment, of detecting whether an aircraft landing gear is securely retained by an uplock arrangement. The method includes receiving (step 314) a first signal from the uplock arrangement, which indicates whether a hook of the uplock arrangement is in the closed configuration. The method also includes receiving (step 353) a second signal, namely an output from a proximity sensor, which detects whether the landing gear is in the up position. The two signals are combined (step 346) by a computer processor forming a part of the avionics equipment to provide a output which indicates whether or not the landing gear is securely retained by the uplock arrangement in the UP and LOCKED condition.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The capture pin is shown in the drawings as being a cylindrical object. It will be appreciated that other shapes and arrangements could be used. The capture pin may comprise a barrel. The capture pin may comprise a rotating part that rotates about a longitudinal axis, for example a roller. The capture pin, may be in the form of a bar or strut, for example, not having a cylindrical, or round, cross-section.

The logic-based signal processing could be performed by an electronic circuit having no computer processor.

The embodiments have application in relation to nose landing gear, main landing gear, wing-mounted landing gear and centrally mounted landing gear assemblies.

The proximity sensors could be provided by means other than variable reluctance based detector devices. For example, a simple mechanical limit-switch/contact-switch could be used.

The proximity sensors may be more or less sensitive than described above. It will be appreciated that the sensitivity of the sensors may not be as precise, in practice, as suggested above. It may for example be the case that the output of the sensor indicating the presence of the target is triggered when the separation of the target from the sensor is anything up to around 5 mm or so. For example, there may be occasions when the sensor is triggered when the separation of the target from the sensor is 7 mm, but other occasions (same set-up) where the sensor is not triggered when the separation of the target from the sensor is 6 mm. Such variations in sensitivity are not an issue in practice of course, if the landing gear when stowed reliably always equates to a separation (of target from sensor) at which the presence of the target can always be detected by the proximity sensor; or if the landing gear when not stowed reliably always causes the target to be sufficiently spaced apart from the sensor that the sensor would never detect the presence of the target.

The arrangement and number of the proximity sensors for detecting the "landing gear UP" condition may be adapted, yet still provide a means of directly detecting when the landing gear is up.

The proximity sensor used could be similar or identical to the "all-metal sensor" (part no. 8-933-01) available from Crane Aerospace & Electronics, which is used on the Airbus A320 aircraft for other purposes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft, comprising;
   a landing gear assembly comprising a landing gear mounted for movement between a deployed position and a stowed position in a landing gear bay,
   a capture pin mounted on the landing gear,
   an uplock for locking the landing gear in the stowed position, the uplock including
      a hook configured to move between (a) a closed position, in which the hook retains the capture pin in a captured position thus preventing the landing gear from moving away from its stowed position and (b) an open position which permits movement of the capture pin from the captured position thus allowing the landing gear to move away from its stowed position, and
      an uplock hook sensor which provides an output signal indicating if the hook is in its closed position,
   a proximity detector comprising a target and a sensor, one of which is mounted on the landing gear, and the other of which is mounted in the landing gear bay such that the sensor detects the target when the hook is in the closed position and the landing gear is stowed with the capture pin retained by the hook in the captured position,
   a signal processing unit arranged to receive an input from the uplock hook sensor, to receive an input from the proximity detector, and to produce an output indicating if both the hook is in its closed position and the capture pin is in its captured position.

2. An aircraft according to claim 1, wherein
   the uplock includes a housing which accommodates at least part of the uplock hook,
   the target of the proximity detector is mounted on structure of the landing gear, and
   the sensor of the proximity detector is mounted on the exterior of the uplock housing.

3. An aircraft according to claim 1, wherein the target of the proximity detector is in the form of a plate mounted on a bracket which is mounted on one of the landing gear and the uplock.

4. An aircraft according to claim 1, wherein the proximity detector is arranged to generate an output signal indicating that the capture pin is in its captured position if the minimum distance between the target and the sensor is less than 10 mm.

5. An aircraft according to claim 1, wherein the sensor of the proximity detector comprises a variable reluctance device and the target comprises ferromagnetic material.

6. An aircraft according to claim 1, wherein the signal processing unit forms part of an avionics system and the signals from the uplock hook sensor and the proximity detector are provided to the signal processing unit via an avionics data network.

7. An aircraft according to claim 6, wherein the avionics system is arranged to provide an alert to the pilot depending on the output indicating if both the hook is in its closed position and the capture pin is in its captured position.

8. An aircraft according to claim 1, wherein the signal processing unit is arranged to combine the signals from the uplock hook sensor and the proximity detector and then send the output via an avionics data network to an avionics system of the aircraft.

9. An aircraft according to claim 8, wherein the avionics system is arranged to provide an alert to the pilot depending on the output indicating if both the hook is in its closed position and the capture pin is in its captured position.

10. An aircraft according to claim 1, wherein the uplock is mounted to aircraft structure via at least one spherical bearing which permits relative movement of the uplock with two degrees of freedom and via at least one variable length strut.

11. An aircraft, comprising:
    a landing gear assembly comprising a landing gear mounted for movement between a deployed position and a stowed position in a landing gear bay,
    a capture pin mounted on the landing gear,
    an uplock for locking the landing gear in the stowed position, the uplock including
        a hook configured to move between (a) a closed position, in which the hook retains the capture pin in a captured position thus preventing the landing gear from moving away from its stowed position and (b) an open position which permits movement of the capture pin from the captured position thus allowing the landing gear to move away from its stowed position, and
        an uplock hook sensor which provides an output signal indicating if the hook is in its closed position,
    a proximity detector comprising a target and a sensor, one of which is mounted on the landing gear, and the other of which is mounted in the landing gear bay such that the sensor detects the target when the hook is in the closed position and the landing gear is stowed with the capture pin retained by the hook in the captured position,
    a signal processing unit arranged to receive an input from the uplock hook sensor, to receive an input from the proximity detector, and to produce an output indicating if both the hook is in its closed position and the capture pin is in its captured position, wherein
    the uplock comprises the target of the proximity detector, and
    the sensor of the proximity detector is mounted on the structure of the landing gear.

12. An aircraft according to claim 11, wherein the target of the proximity detector is formed by part of the uplock hook.

13. An up and locked detector system for an aircraft, which is arranged to receive a first input from an uplock indicating whether the uplock is in a locked configuration, and a second input from a proximity sensor arranged to detect whether a landing gear is in an up position, wherein the second input indicates whether there is a direct detection of a hook of the uplock to indicate whether the landing gear is in the up position and retained by the hook, and
wherein the second input is received from a proximity sensor arranged to detect a tip of the hook.

14. A method of detecting whether an aircraft landing gear is securely retained by an uplock arrangement, the method comprising using both a first signal and a second signal to assess whether the landing gear is retained by the uplock arrangement, the first signal being an output from the uplock arrangement, the output depending on whether a hook of the uplock arrangement is in a closed configuration, the second signal being an output from a proximity sensor, wherein the second signal detects whether the landing gear is retained by the hook based on whether there is a direct detection of the hook by the proximity sensor.

15. A method according to claim 14, wherein the method includes a step of electronically combining the first signal with the second signal to provide a third signal from which third signal it can be ascertained whether or not the landing gear is securely retained by the uplock arrangement.

16. A method according to claim 14, comprising arranging the proximity sensor to detect a tip of the uplock hook.

17. A kit of parts comprising an uplock, and a proximity sensor for directly detecting the position of part of a landing gear, the kit being adapted for use with the aircraft of claim 1.

18. An aircraft, comprising:
    a landing gear assembly comprising a landing gear mounted for movement between a deployed position and a stowed position in a landing gear bay,
    a capture pin mounted on the landing gear,
    an uplock for locking the landing gear in the stowed position, the uplock including
        a hook configured to move between (a) a closed position, in which the hook retains the capture pin in a captured position thus preventing the landing gear from moving away from its stowed position and (b) an open position which permits movement of the capture pin from the captured position thus allowing the landing gear to move away from its stowed position, and
        an uplock hook sensor which provides an output signal indicating if the hook is in its closed position,
    a proximity detector comprising a target and a sensor, one of which is mounted on the landing gear, and the other of which is mounted in the landing gear bay such that the sensor detects the target when the hook is in the closed position and the landing gear is stowed with the capture pin retained by the hook in the captured position,
    a signal processing unit arranged to receive an input from the uplock hook sensor, to receive an input from the proximity detector, and to cause an indication to be provided to the pilot if both the hook is in its closed position and the capture pin is in its captured position.

* * * * *